United States Patent [19]

Huhman

[11] Patent Number: 4,627,446
[45] Date of Patent: Dec. 9, 1986

[54] DOWNWARDLY AND REARWARDLY DIRECTED AIR STREAM FOR HARVESTER WITH VERTICALLY OFFSET ACCELERATOR ROLLS

[75] Inventor: Michael L. Huhman, Kansas City, Mo.

[73] Assignee: Deutz-Allis Corporation, Milwaukee, Wis.

[21] Appl. No.: 711,632

[22] Filed: Mar. 14, 1985

[51] Int. Cl.[4] .................................... A01F 12/44
[52] U.S. Cl. .......................... 130/27 Z; 130/27 HF
[58] Field of Search .............. 130/27 Q, 27 HF, 27 Z

[56] References Cited

U.S. PATENT DOCUMENTS

| | | | |
|---|---|---|---|
| 3,664,349 | 5/1972 | Quick | 130/27 HF |
| 3,776,242 | 12/1973 | Khan | 130/27 Q |
| 3,833,006 | 9/1974 | Temple | 130/27 HF |
| 4,007,744 | 2/1977 | Shaver | 130/27 Q |
| 4,270,551 | 6/1981 | Johnston et al. | 130/27 H |
| 4,303,079 | 12/1981 | Claas et al. | 130/27 Z |
| 4,312,366 | 1/1982 | De Busscher et al. | 130/27 Q |
| 4,457,316 | 7/1984 | James | 130/27 Q |
| 4,458,697 | 7/1984 | James | 130/27 Q |

Primary Examiner—Paul J. Hirsch
Attorney, Agent, or Firm—Charles L. Schwab

[57] ABSTRACT

An axial flow combine employs a pair of counterrotating and vertically offset accelerator rolls to accelerate the threshed material from the threshing section downwardly and forwardly toward the grain pan of the cleaning section. A laminar flow air stream is directed downwardly and rearwardly through the accelerated threshed material to effect efficient separation of chaff and lightweight stalk material from the grain.

5 Claims, 1 Drawing Figure

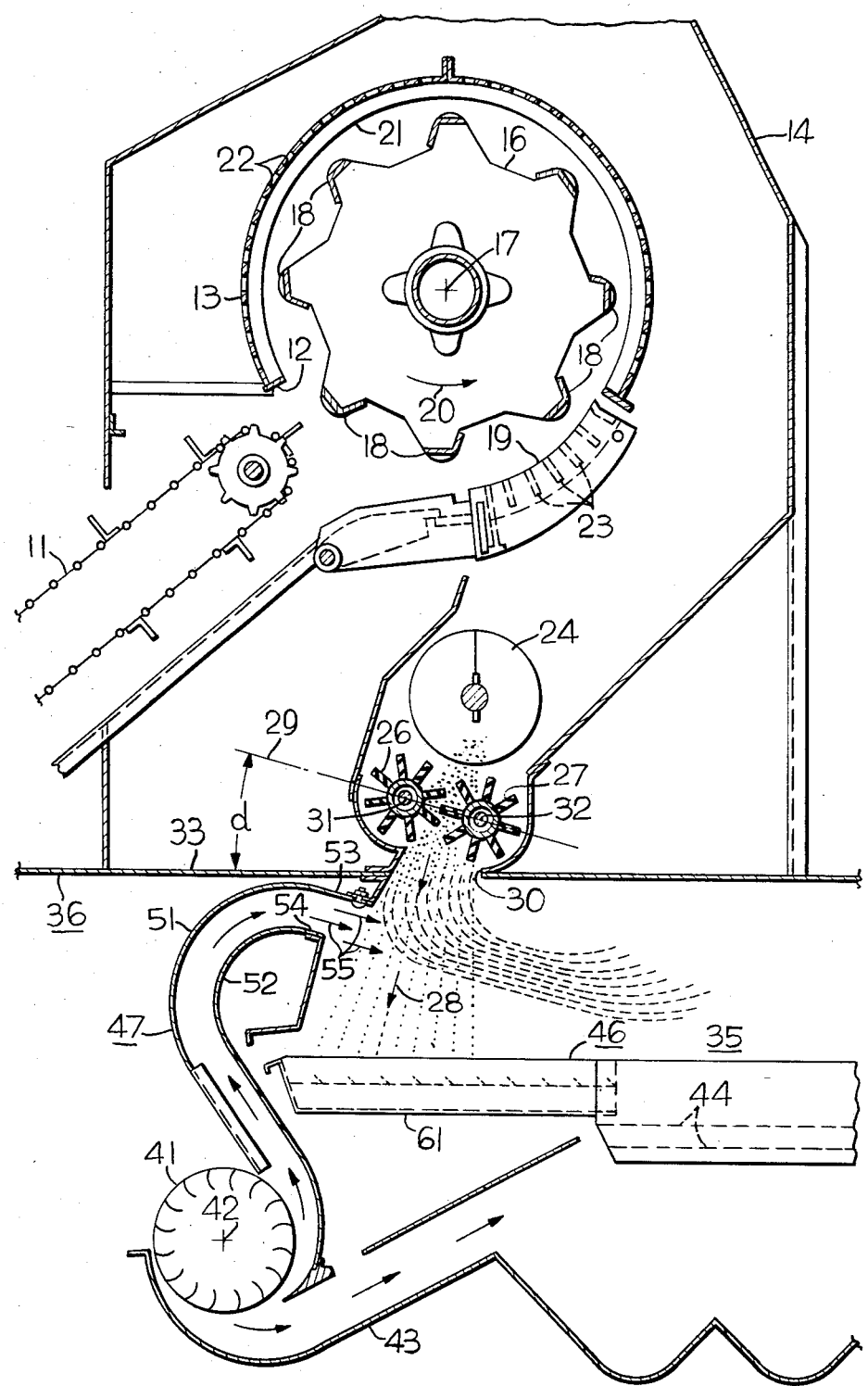

4,627,446

DOWNWARDLY AND REARWARDLY DIRECTED AIR STREAM FOR HARVESTER WITH VERTICALLY OFFSET ACCELERATOR ROLLS

TECHNICAL FIELD

This invention relates to an agricultural harvester and more particularly to the manner of use of an air stream to separate chaff and stalk particles from threshed material discharged by a pair of accelerator rolls.

PRIOR ART STATEMENT

The use of accelerator rolls in a harvester to accelerate the grain and chaff from the threshing cage downwardly through a generally horizontal directed air stream to achieve substantial separation of the lightweight chaff and the like from the grain is well known. U.S. Pat. No. 4,270,551 issued June 2, 1981 to D. K. Johnston and D. A. Suderman shows such a machine. In the beforementioned patent, a baffle was added to the outlet of the air duct supplying the separating air stream so as to direct air across the accelerated grain and chaff at a sufficient distance below the accelerator roll discharge to substantially reduce passage of cleaning air up through the accelerator rolls to the threshing area. U.S. Pat. No. 4,458,697 issued July 10, 1984 to L. R. James for an "Axial Flow Combine with Vertically Offset Accelerator Rolls" illustrates and describes the use of vertically offset accelerator rolls which permit the cleaning section of the combine to be moved forward thereby permitting a reduction in the overall length of the combine. In this last mentioned patent, grain and chaff is accelerated downwardly and forwardly by the vertically offset accelerator rolls through a rearward and slightly upward directed air stream. It has been found that the air stream thus directed results in undesired air flow upwardly through the accelerator rolls which retards downward movement of grain and chaff to the accelerator rolls and produces an excessively dirty atmosphere at the operator's station at the front of the combine. Also, the air stream thus directed results in excessive turbulence at the duct discharge area, thereby resulting in less effective separation of chaff and straw particles from the accelerated grain. Additionally, the slightly upward and rearwardly directed air tends to carry or blow some grain entrained in the chaff and stalk particles from the rear of the combine.

SUMMARY OF THE INVENTION

The agricultural harvester using this invention will normally have a threshing section with a threshing rotor disposed on a generally horizontal axis and a concave on the underside of the rotor, and a cleaning section having a grain pan below the concave and a sieve rearwardly of the grain pan. Front and rear counterrotating accelerator rolls are disposed above the grain pan and in underlying relation to the concave. The accelerator rolls are disposed on a pair of generally horizontal and parallel axes and receive therebetween threshed material from the concave. The axis of the front accelerator roll is vertically offset above the axis of the rear accelerator roll whereby threshed material is accelerated downwardly and forwardly toward the grain pan. Air delivery means is provided which includes a lower duct directing a flow of air rearwardly and upwardly through the sieve and an upper duct having an outlet portion disposed a predetermined distance below and parallel to a plane through the axes of the accelerator rolls. The outlet portion directs a layer of laminar flow air rearwardly and downwardly toward the sieves and through, and transverse to, the accelerated threshed material passing from the accelerator rolls, thereby blowing chaff and stalk particles rearwardly from the kernels of grain which pass downwardly to the grain pan. Preferably, the volume of air from the lower duct passing upwardly through the sieve is sufficient to prevent the upper duct air flow from impinging separated chaff and stalk particles upon the top of the sieve.

Objectives of this invention are (a) reduced turbulence at the intersection of the upper duct air flow with the accelerated threshed material so as to improve cleaning of the grain, and (b) less upward air flow to the threshing section to reduce dirty atmospheric conditions at the front of the combine, where the operator is stationed, and to avoid retardation of movement of threshed material to the accelerator rolls.

BRIEF DESCRIPTION OF THE DRAWING

One embodiment of the invention is illustrated in the drawing which is a partial section on a longitudinal vertical plane through a combine.

DETAILED DESCRIPTION OF THE DRAWING

As shown in the drawing, crop material is conveyed by a feeder conveyor 11 to an inlet 12 of a cylindrical foraminous cage 13 mounted in a processor housing 14 or threshing section of an an axial flow combine. A threshing rotor 16 is disposed within the cage 13 and its horizontal transverse axis 17 is also the axis of the cage. The crop material enters the cage opening 12 and is impacted by rasp bars 18 on the rotor as it passes over the concave 19. Spiral ribs 21 on the inside of the cage cause stalk material of the crop to move axially in the cage 13 to a discharge, not shown, as the rotor rotates in the direction of the arrow 20. Threshed material consisting of grain, chaff and small stalk particles pass through the radial openings 22 in the cage 13 and fall between the bars 23 of the concave to a horizontal transverse distribution auger 24 which distributes the threshed material to a pair of counterrotating and vertically offset accelerator rolls 26, 27. The axis 31 of the front accelerator roll 26 is vertically offset above the axis 32 of the rear accelerator roll 27. Threshed material is accelerated forwardly and downwardly between the parallel accelerator rolls 26, 27 through a discharge opening 30 in the threshing section in the direction of the arrow 28 to the cleaning section 35. The arrow 28 is substantially at right angles to an inclined plane 29 through the horizontal transverse axes 31, 32 of the accelerator rolls 26, 27. The plane 29 slopes upwardly and forwardly at an angle "d" of 15 degrees from a horizontal plane as represented by a horizontal wall 33 on the combine main frame 36.

A transverse fan 41 rotating about a transverse horizontal axis 42 discharges pressurized air through a lower cleaning duct 43 to the sieves 44 of the cleaning shoe assembly 46 and through an upper duct 47.

The upper duct 47 is fabricated by bending flat sheets of metal to form S-shaped walls 51, 52 which extend transversely between the transversely spaced sides, not shown, of the cleaning section 35 of the combine. Near the outlet portion of the upper duct 47, the walls 51, 52 have terminal segments on portions 53, 54 which each slop downwardly and rearwardly at an angle of 15 degrees to the horizon. In other words, the portions 53, 54 and the outlet portion of duct 47 are parallel to the plane 29 through the axes 31, 32 of the vertically offset accelerator rolls 26, 27. Thus, a layer of laminar flow air is discharged from the duct in the direction of arrows 55 which are at right angles to the arrow 28 representing the direction of the downwardly accelerated threshed material.

OPERATION

The downwardly and rearwardly directed stream of air leaving the upper duct 47 intersects the accelerated threshed material at right angles and passes rearwardly through the threshed material carrying with it the chaff and lightweight particles of stalk material. The accelerated grain, being heavier, passes downwardly to the grain pan 61 of the shaker or shoe assembly 46 which also includes the sieves 44 disposed rearwardly of the grain pan 61. Although the air from the upper duct air 47 is directed downwardly toward the sieves 44, the air delivered by the lower duct 43 is passing upwardly through the sieves thereby causing the upper duct air to turn to a horizontal stream thus aiding rearward discharging movement of the chaff and lightweight crop particles. By directing the upper duct air downwardly 15 degrees there is less tendency for air to pass upwardly through the accelerator rolls 26, 27 and there is less turbulence in the area above the grain pan 61 where the air intersects the accelerated threshed material. Thus, the air stream from duct 47 is more efficient in removing the chaff and lightweight particles from the grain than would be the case if substantial turbulence existed at the intersection, as was the case with the prior art construction. Since there is reduced upward movement of air through the accelerator rolls, there is less dirty air discharged from the front of the combine and there is less retardation of the flow of the threshed material downwardly to and between the accelerator rolls. In summary, the operator station area at the front of the combine is cleaner, machine capacity is increased and the cleaning efficiency is enhanced by use of this invention in harvesting equipment.

The embodiments of the invention in which an exclusive property or privilege is claimed are defined as follows:

1. In an agricultural harvester having a threshing section with a threshing rotor disposed on a generally horizontal axis and a concave on the underside of said rotor, and a cleaning section having a grain pan below said concave and a sieve rearwardly of said grain pan, the combination comprising:
   front and rear counterrotating accelerator rolls disposed above said grain pan and in underlying relation to said concave, said accelerator rolls being disposed on a pair of generally horizontal and parallel axes and receiving therebetween threshed material from said concave, the axis of said front accelerator roll being vertically offset above the axis of the rear accelerator roll whereby threshed material is accelerated in a downwardly and forwardly direction toward said grain pan, and
   air delivery means including a lower duct directing a flow of air rearwardly and upwardly through said sieve and an upper duct having an outlet portion disposed a predetermined distance below and parallel to a plane through said axes of said accelerator rolls, said outlet portion directing a layer of laminar flow air rearwardly and downwardly toward said sieves, and through and transverse to the accelerated threshed material passing from said accelerator rolls thereby blowing chaff and stalk particles rearwardly from the kernels of grain which pass downwardly to said grain pan.

2. The harvester of claim 1 wherein the volume of air from said lower duct passing upwardly through said sieve is sufficient to prevent the upper duct air flow from impinging separated chaff and stalk particles upon the top of said sieve.

3. The harvester of claim 1 wherein said plane is disposed substantially 15 degrees to the horizon.

4. In a combine having a threshing section and a cleaning section including a grain pan and a sieve rearwardly of said grain pan, the combination comprising:
   an accelerator mechanism above said grain pan including an accelerator roll disposed on a generally horizontal transverse axis and receiving threshed material from said threshing section, said accelerator mechanism being operable to accelerate said threshed material in a downwardly and forwardly direction toward said grain pan, and
   air delivery means including a lower duct directing a flow of air rearwardly and upwardly through said sieve and an upper duct having an outlet portion disposed a predetermined distance below said axis and at a right angle to said direction, said outlet portion directing a layer of laminar flow air rearwardly and downwardly toward said sieves, and through and transverse to the accelerated threshed material passing from said accelerator mechanism thereby blowing chaff and stalk particles rearwardly from the kernels of grain which pass downwardly to said grain pan.

5. The harvester of claim 4 wherein the volume of air from said lower duct passing upwardly through said sieve is sufficient to prevent the upper duct air flow from impinging separated chaff and stalk particles upon the top of said sieve.

* * * * *